United States Patent
Hung et al.

(10) Patent No.: US 7,396,062 B2
(45) Date of Patent: Jul. 8, 2008

(54) STRUCTURAL PEDESTAL CONDUIT FOR AIR HANDLING AND ELECTRICAL ROUTING

(75) Inventors: Stephen T. Hung, Grosse Point Park, MI (US); Ronald K. Roberts, Dearborn, MI (US); Daniel R. Vander Sluis, Plymouth, MI (US); Donald Wozniak, Plymouth, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 80 days.

(21) Appl. No.: 11/365,150

(22) Filed: Mar. 1, 2006

(65) Prior Publication Data

US 2007/0205623 A1    Sep. 6, 2007

(51) Int. Cl.
B60R 11/00    (2006.01)
(52) U.S. Cl. .................... 296/24.34; 296/37.8
(58) Field of Classification Search ............. 296/24.34, 296/37.8, 37.14, 37.15, 208; 297/188.08
See application file for complete search history.

(56) References Cited

U.S. PATENT DOCUMENTS

| | | | |
|---|---|---|---|
| 3,356,409 A | 12/1967 | Belsky et al. | |
| 4,512,239 A * | 4/1985 | Watanabe et al. | 454/144 |
| 4,747,636 A * | 5/1988 | Harasaki et al. | 296/181.4 |
| 5,511,842 A | 4/1996 | Dillon | |
| 5,673,964 A | 10/1997 | Roan et al. | |
| 5,715,140 A | 2/1998 | Sinkunas et al. | |
| 5,897,155 A | 4/1999 | Kerner et al. | |
| 5,902,181 A | 5/1999 | Bain | |
| 6,116,674 A | 9/2000 | Allison et al. | |
| 6,129,400 A * | 10/2000 | Jakubiec et al. | 296/37.14 |
| 6,152,522 A | 11/2000 | Boulay et al. | |
| 6,158,795 A | 12/2000 | Gray et al. | |
| 6,203,088 B1 | 3/2001 | Fernandez et al. | |
| 6,301,909 B1 * | 10/2001 | Hayasaka | 62/175 |
| 6,338,514 B1 | 1/2002 | Arold et al. | |
| 6,494,527 B1 | 12/2002 | Bischoff | |
| 6,537,641 B1 | 3/2003 | Kroll | |
| 6,547,301 B1 | 4/2003 | Keller | |
| 6,715,814 B1 | 4/2004 | Hoyle | |
| 6,719,343 B2 | 4/2004 | Emerling et al. | |
| 6,746,065 B1 | 6/2004 | Chan | |

(Continued)

FOREIGN PATENT DOCUMENTS

JP    57130841    8/1982

(Continued)

Primary Examiner—Dennis H Pedder
(74) Attorney, Agent, or Firm—Brinks Hofer Gilson & Lione

(57) ABSTRACT

A pedestal console for a motor vehicle includes a housing stationarily mounted within the vehicle beneath and transverse to a bench seat of the vehicle. The console includes an air duct defined by structural features extending the length of the console. This allows air from a forward ventilation system to be provided, through the air duct, to an aft portion of the vehicle. The structural features extend between the bottom surface and the top surface of the console and are dimensioned to allow the console to accept passenger floor loads. To reduce cost and parts count, the entire console is formed of a one piece construction. Finally, an interior opening may be provided to route wiring of the vehicle's electrical system to the aft portion of the vehicle.

15 Claims, 4 Drawing Sheets

U.S. PATENT DOCUMENTS

| | | |
|---|---|---|
| 6,752,444 B2 | 6/2004 | Kitano et al. |
| 6,899,366 B2 * | 5/2005 | Krueger et al. .............. 296/37.8 |
| 2003/0098589 A1 * | 5/2003 | Wikman et al. ............ 296/24.1 |
| 2004/0160089 A1 * | 8/2004 | Gupta et al. ................. 296/208 |

FOREIGN PATENT DOCUMENTS

| | | |
|---|---|---|
| JP | 59034944 | 2/1984 |
| JP | 2004 243932 | 9/2004 |

* cited by examiner

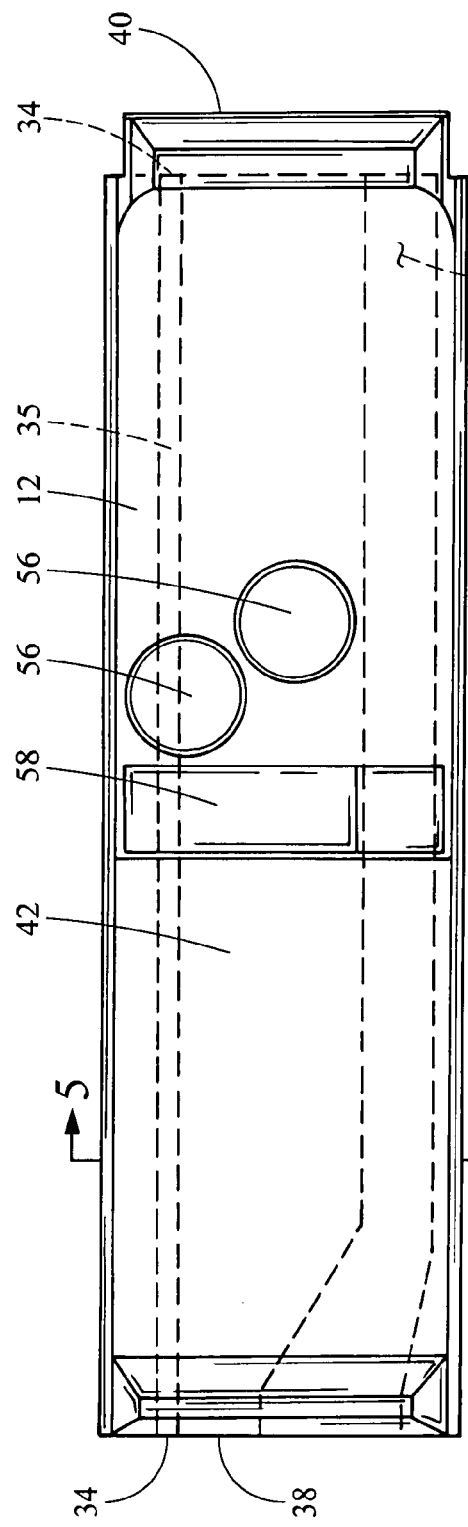
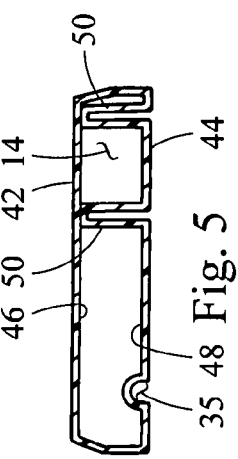
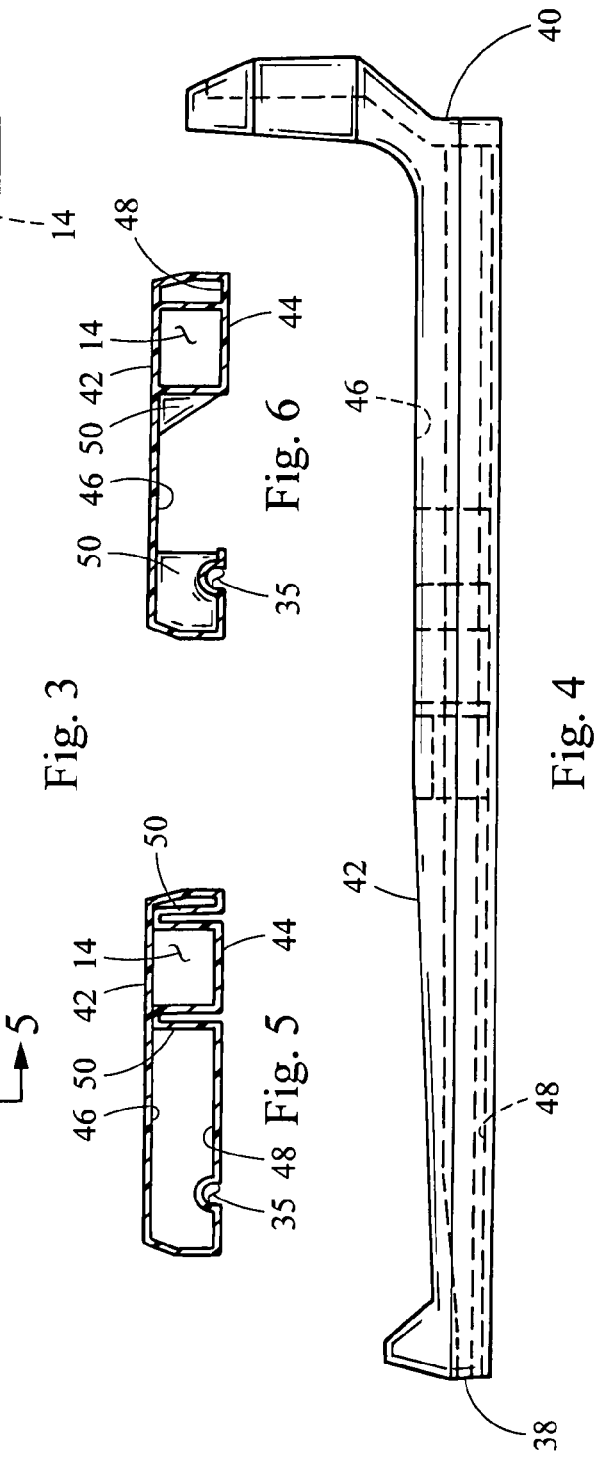
Fig. 3
Fig. 6
Fig. 5
Fig. 4

STRUCTURAL PEDESTAL CONDUIT FOR AIR HANDLING AND ELECTRICAL ROUTING

BACKGROUND

1. Field of the Invention

The present invention generally relates to automotive interior subsystems. More specifically, the invention relates to a center console for air handling and electrical routing used in conjunction with a bench seat.

2. Description of Related Art

There are a number of common seating arrangements for motor vehicle interiors. Some vehicles have only a single row of seats, while others may have two or more rows. Depending on the size of the vehicle, a row may seat as few as one passenger, while two or three passengers is more common.

The seats of each row may be made up of either individual bucket seats or a single bench. A bucket seat usually offers the greatest comfort and control to each passenger, having multiple adjustments independent of the other passengers. However, bench seats provide maximum seating.

Bench seats have evolved from a simple, immobile bench spanning the width of the vehicle interior into moving split bench arrangements. A split bench combines the attributes of both bench and bucket seats. This is done by splitting the bench into at least two portions capable of at least independent movement fore and aft. For example, a 60/40 split bench divides the bench into two portions, where the driver sits in the left 40% while up to two passengers sit in the right 60% of the seat. This allows the passengers to adjust their portion of the seat independently of the driver.

Another bench seat arrangement is a 40/20/40 split bench. Here, the driver and a passenger sit on the left and right 40% of the bench and another passenger sits on the middle 20%. Typically, the middle 20% is stationary and not adjustable while the left and right portions may move and tilt. When the middle 20% is not in use, the back often may be folded forward for use as an arm rest by the driver and passenger and is usually where any cup holders and storage bins are located.

However, because a vehicle having a bench seat lacks a conventional center console, storage is limited. Furthermore, a conventional center console also provides a protected space through which air ducts and electrical wiring may be routed to a rear passenger compartment. As a result, it is more difficult to supply rear seat passengers with ventilation and electrical controls in vehicles having a bench seat. This is because there is no convenient location through which to route air ducts and electrical harnesses to the rear passenger area without potential damage by the center seat passenger. This is particularly problematic in vehicles having a large interior height, such as a van or SUV, where the center seat passenger would step or squat upon any components routed along a central area of the floor of the vehicle, potentially damaging the components.

Existing solutions attempt to avoid damage by creating small, multiple piece ducts that seek to route around or mitigate exposure to areas of likely damage. For example, in vehicles having a low interior height, such as a car, a non-structural duct may be run along the side of the central tunnel bulge of the vehicle's floor. The duct is protected by the carpet and pad of the vehicle, and by the fact that the contour of the tunnel tends to prevent direct loading of the duct. However, such a duct must conform to the tunnel and have a small cross sectional area, which reduces the amount of air flow to the rear passengers if it is to be used for air handling. Nevertheless, this technique may not always be effective. This is because it is still possible that a passenger may place a direct load on the duct and collapse it. Also, to achieve such routing of ducts, they are often made of multiple components, increasing cost, assembly time and opportunity for failure.

In view of the above, it is apparent that there exists a need for an improved, cost effective means associated with a front bench seat to route air and electrical wiring to rear seat passengers.

SUMMARY

In satisfying the above need, as well as overcoming the enumerated drawbacks and other limitations of the related art, the present invention provides an interior console mounted in a stationary manner within a motor vehicle. The console includes an air duct, openings and structural features wherein the console, air duct, and structural features are a single unitary component. The console is mounted beneath, and runs transverse to, a bench seat such that air from a forward ventilation system is readily provided through the air duct to an aft portion of the vehicle. The structural features extend between a bottom surface of the console and a top surface of the console and are dimensioned to allow the top surface of the console to accept floor loads without damage to the duct or console. In addition, the openings may be used to route electrical wiring to the aft portion of the vehicle. Further features of the console may include cup holders, compartments, bins, or electrical ports located to be used by either the front or rear seat passengers.

Further objects, features and advantages of this invention will become readily apparent to persons skilled in the art after a review of the following description, with reference to the drawings and claims that are appended to and form a part of this specification.

BRIEF DESCRIPTION OF THE DRAWINGS

FIG. 3 is a top view of the console;

FIG. 4 is a left side view of the console;

FIG. 5 is a sectional view, generally along line 5-5 in FIG. 4, of a blow molded console;

FIG. 6 is a sectional view through line 5-5 of an injection molded console;

DETAILED DESCRIPTION

Figure 1:
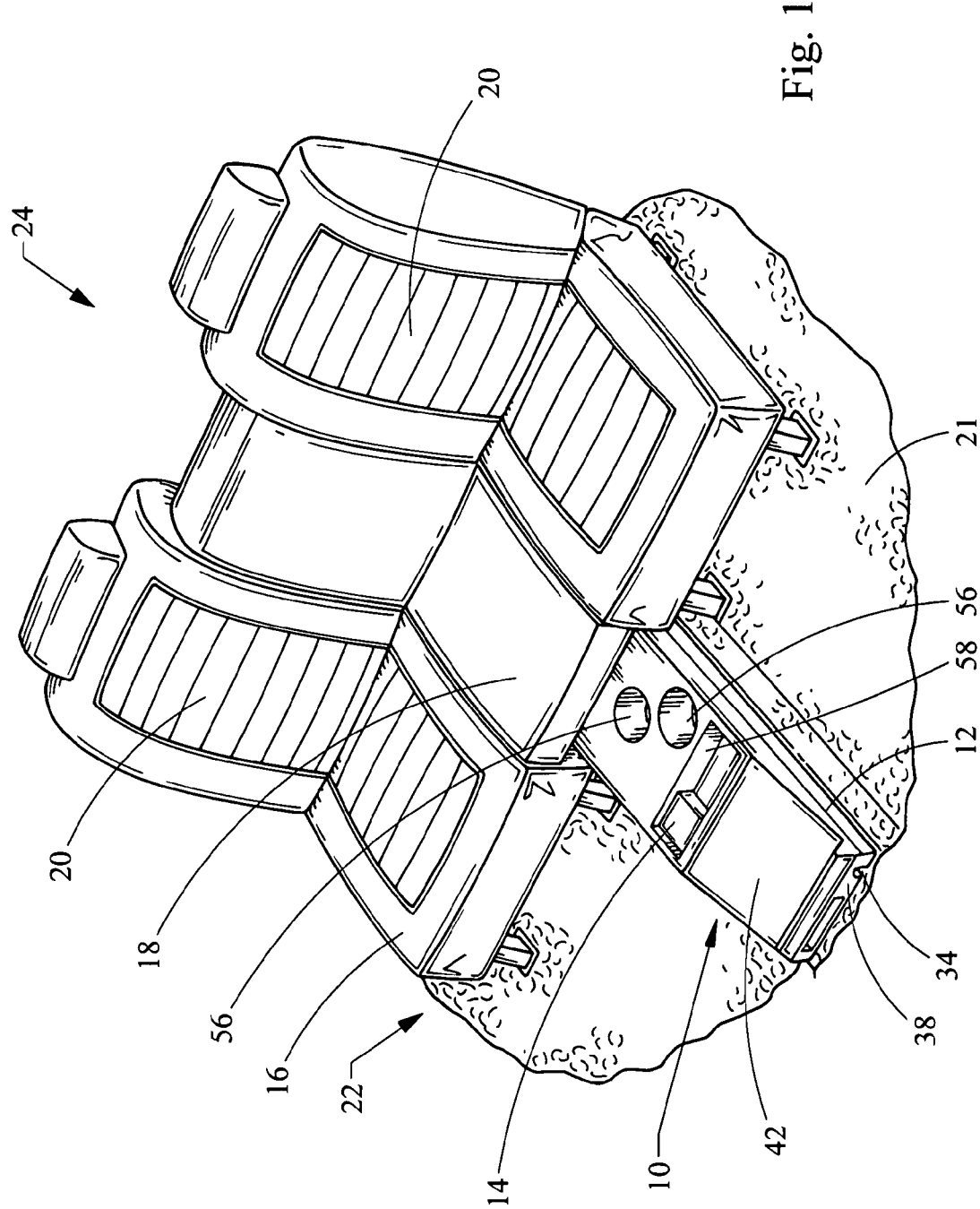
FIG. 1 is a front perspective view of a bench seat assembly with a console under the center seat according to the principles of the present invention.
Figure 2:
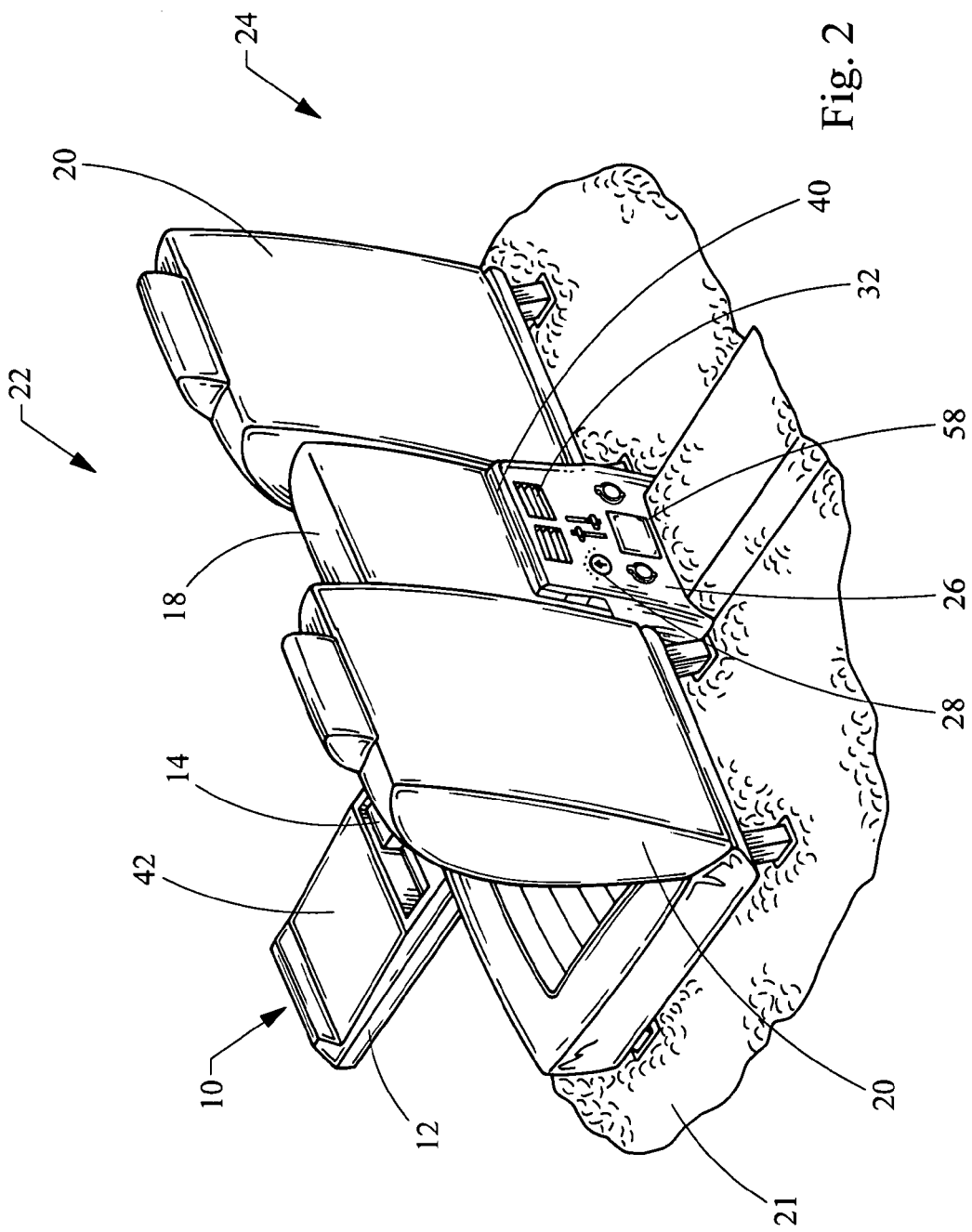
FIG. 2 is a rear view of the bench seat with the console of FIG. 1.

Referring now to the drawings, a console embodying the principles of the present invention is illustrated in FIG. 1 and generally designated at 10. The console 10 is mounted in a stationary manner to a floor 21 within a motor vehicle and includes a frame 12 and portions defining an air duct 14. Oriented transverse and above the console 10 is a bench seat 16 also mounted to the vehicle floor 21. The bench seat 16 may be any type, but the example shown is of the 40/20/40 variety. In this embodiment, the center seat 18 occupies about 20% of the bench width and is typically stationary, but it may be moveable typically in fore and aft directions. The center seat 18 is flanked on either side by the primary driver and passenger seats 20 (hereinafter just "primary seats 20"), each taking up about 40% of the width. The primary seats 20 may move linearly, fore and aft parallel to the console 10 and may be provided to raise, lower and tilt. The console 10 is of sufficient length to extend generally from a firewall (not shown), forward of the front seating area 22, to a rear seating area 24 (see FIG. 2) of the motor vehicle. This allows air from a vehicle ventilation system (not shown) to be directed through the air duct 14 and into the rear seating area 24.

FIGS. 3 and 4 illustrate the console 10, which primarily includes the frame 12 and the air duct 14 (shown in hidden lines). They are formed together as a single unitary piece, usually of plastic, by conventional blow molding or injection molding techniques. As a result, the console 10 reduces parts count, assembly time, cost, increases reliability, and reduces cost.

Figure 7:
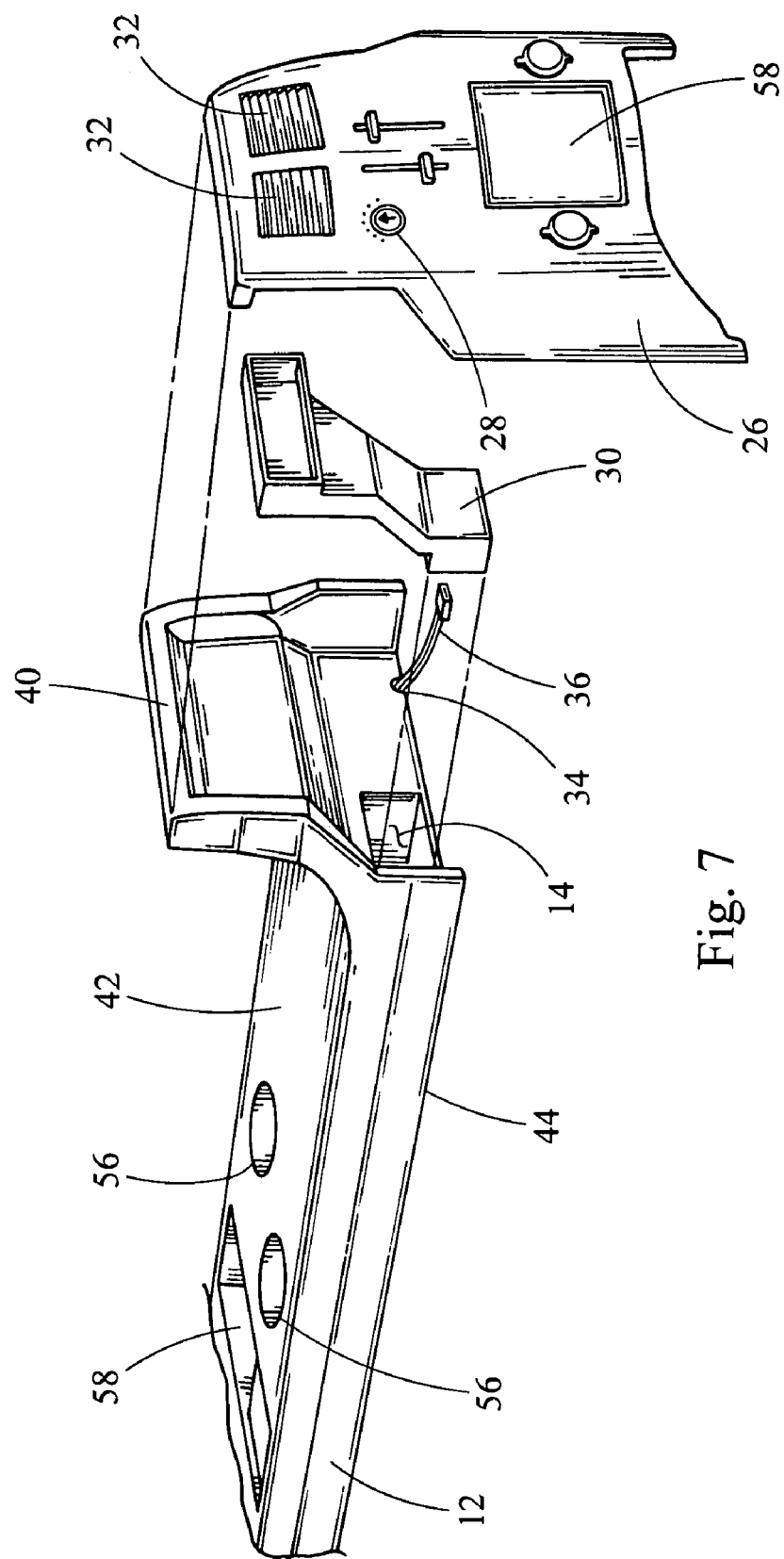
FIG. 7 is an exploded, left rear perspective view of the console.

More particularly, the frame 12 includes a front end 38, rear end 40, top surface 42 and a bottom surface 44 (see FIG. 4). Oriented to face the interior volume of the frame 12, the top and bottom surfaces (42, 44) respectively have a top interior face 46 and a bottom interior face 48. Possible additional features (see FIG. 7) of the console 10 are a cosmetic cover 26, controls 28, and a rear duct riser 30. The cover 26 may have adjustable air vents 32 by which rear seat passengers may block or adjust the direction of air flow into the rear seating area 24. Finally, the console 10 includes openings 34 through which wiring 36 of the motor vehicle may be routed to the rear seating area 24.

The frame 12 is provided with structural elements 50 extending between the top interior face 46 and the bottom interior face 48 that are designed to transfer loads applied the top surface 42 down to the bottom surface 44 without incurring damage to the air duct 14. In a blow molded embodiment, as shown in FIG. 5, the structural elements 50 are formed as double walled extensions of the bottom surface 44 on either side of the air duct 14, that locally rise up to contact the top interior face 46. Using known methods, such as a thermal tack, the structural elements 50, and extensions of the bottom face 48, are locally secured to the top face 46, creating a rigid structure. As an alternative, the extensions forming the structural elements 50 could extend downward from the top surface 42 and contact the bottom surface 44. Alternately, if the console 10 is injection molded, the structural elements 50 may be ribs or columns molded directly into the frame 12, on either side of the air duct 14 (See FIG. 6). The ribs thus would extend between the top face 46 and the bottom face 48 to transfer loads.

The purpose of the structural elements 50 is to allow the cross-sectional area of the air duct 14 to be maximized, while resisting loads applied to the top surface 42 of the frame 12. Thus, the structural elements 50 are of the nature of a support column and greater air flow may be provided to the rear seating area 24 through the air duct 14 and under the center seat 18 of the bench seat 16. Similarly, the structural elements 50 protect a tunnel 35 extending between the openings 34. The tunnel 35 facilitates routing the wiring 36 to the rear seating area 24 through the openings 34 minimizing any risk of damage. As a result, the console 10 may be placed directly upon the vehicle floor 21 in front of, and beneath, the center seat 18 as a structural component of the floor 21 and is capable of accepting interior floor loads from passengers. In effect, the console 10 becomes a false floor.

In some embodiments, part or all of the console 10 may be covered with carpeting and disguised to appear as an integral component of the vehicle floor 21. In other embodiments, the carpet may be blow molded directly onto the console 10. In either case, the structural elements 50 provide rigidity to the console 10 such that a person may stand or squat on the console 10 without damage to the frame 12, air duct 14, or wiring 36. Obviously, the console 10 can be trimmed to match the trim level of the vehicle.

An added advantage of the console 10 is its provision of other features useful to front and rear passengers. For example, controls 28 in the rear seating area 24 may be electrically connected to the ventilation system via the wiring 36 extended through the wiring opening 34. Thus, rear passengers may regulate the volume and temperature of the air supplied to the rear seating area 24. Many other additional features, for example, headphones, jacks, power ports, radio controls and video displays may also be incorporated into the rear cover 26 and connected via wiring run through the wiring opening 34 defined in the console 10.

Finally, the console 10 also provides a convenient location in which to provide cup holders 56 or storage bins 58. If they are included, they would most likely be provided in the false floor portions so that front seat passengers will have access to these features, even when the center seat 18 is being used.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

The invention claimed is:

1. A pedestal conduit for a motor vehicle having a bench seat mounted to a top surface of the vehicle floor, the bench seat having a driver side seat, a passenger side seat and a center seat, the pedestal conduit comprising:

a console including;

a housing having a top wall, a bottom wall, opposing side walls, a fore end and an aft end, the fore end being located forward, relative to the vehicle, of the bench seat, the aft end being located rearward of a front end of the bench seat, the housing including a pair of generally opposed structural extensions provided substantially along the length of the housing between the fore and aft ends and located between the opposing side walls, the structural extensions being formed from a portion of at least one of the top and bottom walls and extending between the top and bottom walls, the structural extensions defining with the top and bottom walls an air duct extending substantially the length of the console between the fore and aft ends.

2. The pedestal conduit of claim 1 wherein the console is of a one piece construction.

3. The pedestal conduit of claim 1 wherein the structural extensions are ribs formed from both the top and bottom walls.

4. The pedestal conduit of claim 1 wherein the structural extensions are extensions of the bottom wall rising upward and contacting an interior face of the top wall.

5. The pedestal conduit of claim 4 wherein the structural extensions are secured to the interior face of the top wall.

6. The pedestal conduit of claim 5 wherein the structural extensions are secured by a thermal tack to the interior face of the top wall.

7. The pedestal conduit of claim 1 wherein the structural extensions are double walled.

8. The pedestal conduit of claim 1 wherein the console includes portions defining a wire run extending between the fore and aft ends.

9. The pedestal conduit of claim 1 further comprising a rear cover attached to the aft end of the console, the rear cover including controls provided thereon for a rear seating area of the vehicle.

10. The pedestal conduit of claim 9 wherein the controls include air temperature and flow controls to regulate air provided through the air duct.

11. The pedestal conduit of claim 9 wherein the controls in the console include radio controls.

12. The interior subsystem of claim 9 wherein the rear cover includes power ports.

13. The pedestal conduit of claim 9 wherein the rear cover includes an adjustable, air register defining an outlet for the air duct into the rear seating area of the vehicle.

14. The pedestal conduit of claim 1 wherein the console includes portions defining storage bins.

15. The pedestal conduit of claim 14 wherein the storage bins are located toward the fore end of the console.

* * * * *